No. 617,162. Patented Jan. 3, 1899.
J. W. HYATT.
STRAINER AND FILTER.
(Application filed Nov. 11, 1898.)
(No Model.) 3 Sheets—Sheet 1.

WITNESSES:
Fr. N. Roehrich
J. Hindon Hyde
James C. Reilly

INVENTOR
John W. Hyatt,
BY J. Hindon Hyde
ATTORNEY

No. 617,162. Patented Jan. 3, 1899.
J. W. HYATT.
STRAINER AND FILTER.
(Application filed Nov. 11, 1898.)
(No Model.) 3 Sheets—Sheet 2.
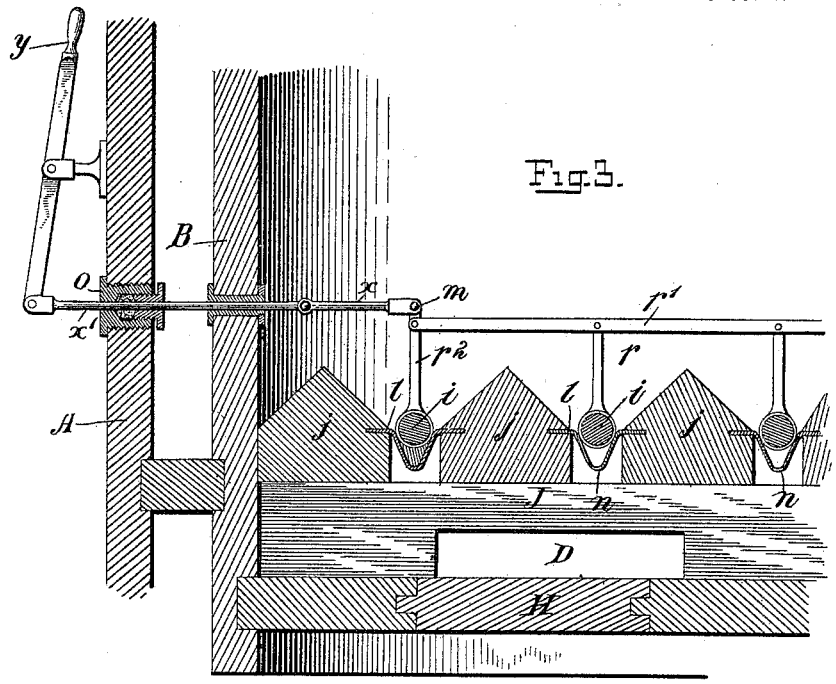
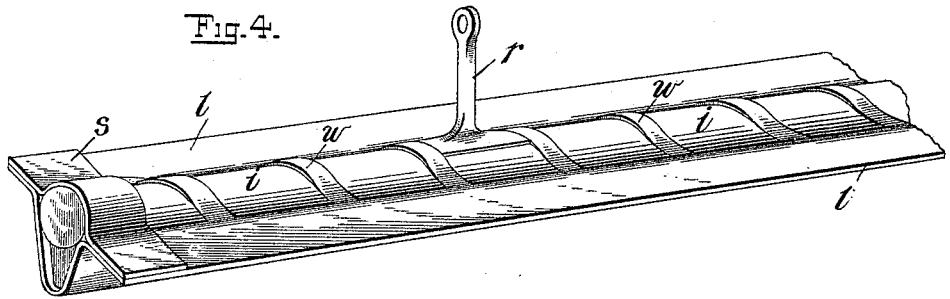
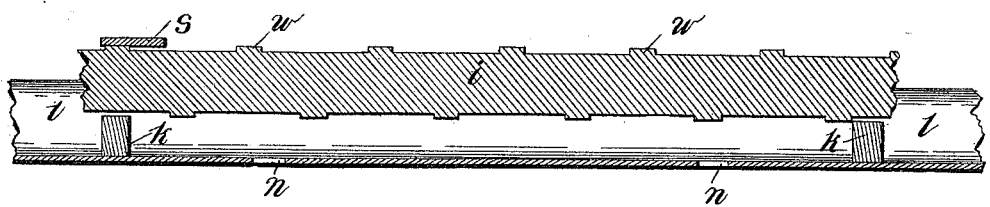
WITNESSES:
INVENTOR
John W. Hyatt,
BY
ATTORNEY No. 617,162. Patented Jan. 3, 1899.
J. W. HYATT.
STRAINER AND FILTER.
(Application filed Nov. 11, 1898.)
(No Model.) 3 Sheets—Sheet 3.
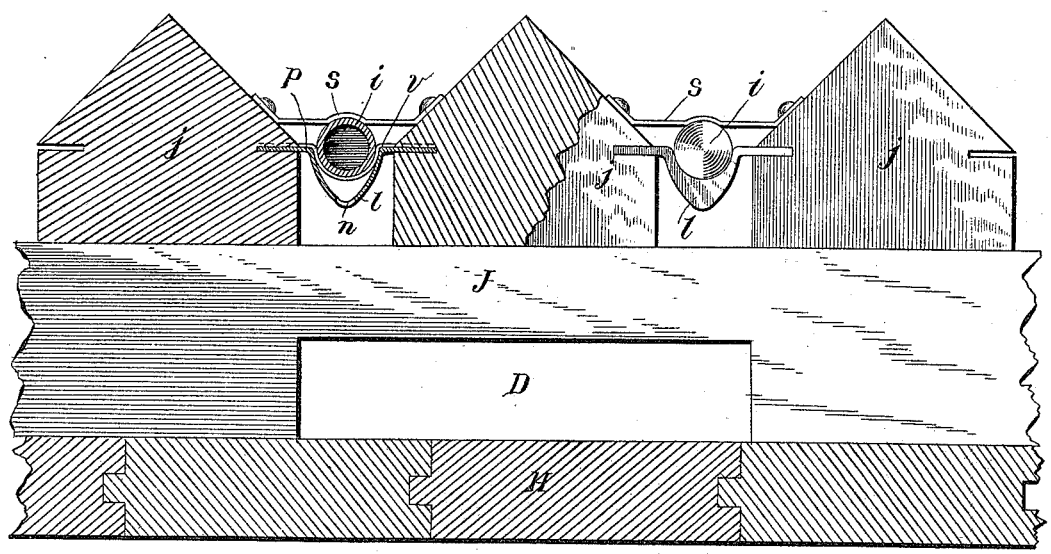
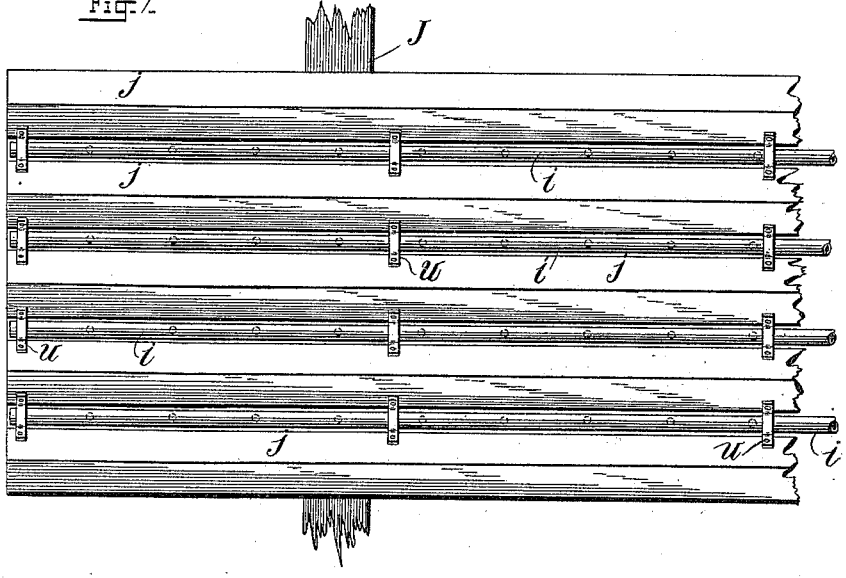
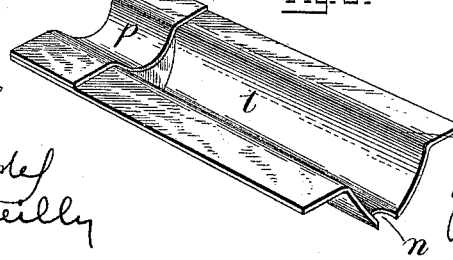
WITNESSES:
Fr. N. Roehrich
J. Hindon Hyde
James C. Reilly
INVENTOR
John W. Hyatt,
BY
J. Hindon Hyde
ATTORNEY

UNITED STATES PATENT OFFICE.

JOHN W. HYATT, OF NEWARK, NEW JERSEY, ASSIGNOR TO THE NEW YORK FILTER MANUFACTURING COMPANY, OF NEW YORK, N. Y.

STRAINER AND FILTER.

SPECIFICATION forming part of Letters Patent No. 617,162, dated January 3, 1899.

Application filed November 11, 1898. Serial No. 696,123. (No model.)

*To all whom it may concern:*

Be it known that I, JOHN W. HYATT, a citizen of the United States, and a resident of the city of Newark, in the county of Essex and State of New Jersey, have invented certain new and useful Improvements in the Construction of Strainers for Filters, of which the following is a specification.

The invention relates to the construction of the strainer or bed upon which the sand or other filtering material rests; and it consists in peculiar features by which the strainer allows the escape of the filtered water without the accompaniment of any of the filtering material and also admits the wash-water for washing the filter-bed to all parts of such filter-bed.

I have shown my invention in connection with a well-known type of gravity-filter in which there are two chambers, the upper chamber containing the filtering material and constituting the filter-chamber proper and a lower sediment-chamber, although I do not confine my invention to this peculiar type of filter, for it may be used in any suitable filter.

My invention is illustrated in the accompanying drawings, in which—

Figure 1:
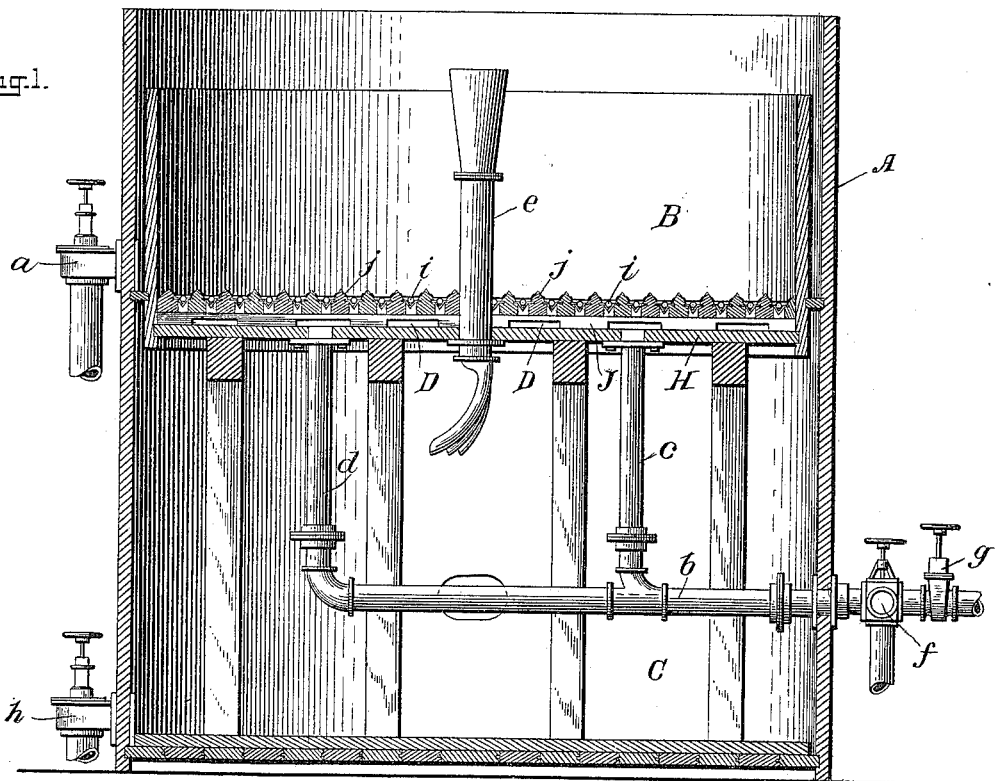
Figure 2:
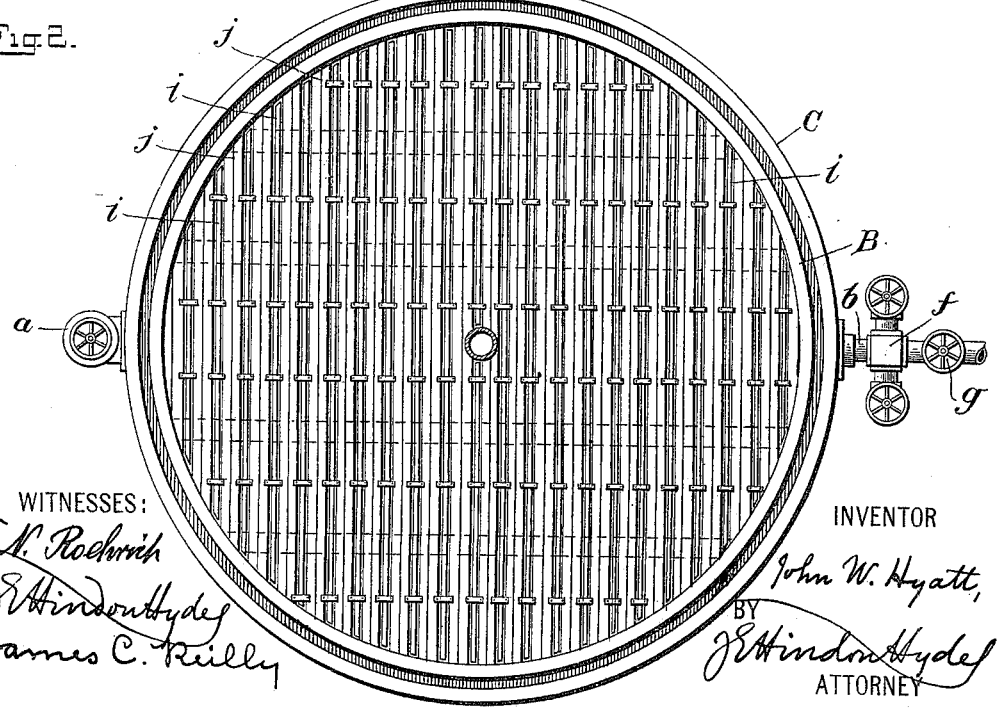

Figure 1 is a part sectional and part perspective view of the apparatus. Fig. 2 is a plan view. Fig. 3 is a sectional view of a portion of the apparatus. Fig. 4 is a perspective view of one of the water-channels and superposed rod. Fig. 5 is a sectional view of a portion of one of the rods. Fig. 6 is a part sectional view and a part end view of a portion of my apparatus. Fig. 7 is an enlarged plan view of a portion of my device, and Fig. 8 is a perspective view of a portion of the channel in which the rods lie.

Referring to the drawings, Figs. 1 and 2, A is the outer case of the filter, which is divided into two chambers. The upper chamber B is that which contains the filtering material (not shown) and C is the sediment-chamber. The valve and pipe $a$ are the outlet for the wash-water from the chamber B, this water overflowing from the chamber B into the annular recess between such chamber and the outer case A and out through the valve and pipe $a$. A rotatable wash-pipe for the sediment-chamber C is shown at $e$, the means for rotating this pipe not being shown. The pipe $b$ is divided into two branches $d$ and $c$, which communicate with the bottom of the filtering-chamber B and furnish an outlet for the filtered water, as well as an inlet for the wash-water. The valves $f$ and $g$ are valves for the outlet of the filtered water and the inlet for the wash-water, the valve $f$ being a double valve, as shown in Fig. 2, to permit of washing either with filtered or unfiltered water, as desired. The valve $h$ is the outlet-valve for the wash-water and the sediment from the chamber C.

Resting upon the water-tight bottom H of the filtering-chamber B and suitably secured thereto is the strainer, and it is to the construction of this strainer that my invention relates.

Upon the water-tight bottom H of the filter-chamber B and which is pierced by the pipes $c$ $d$ are placed the foundation-beams J for the false bottom. These beams are pierced at suitable intervals with openings D, which allow free access of water to all parts of the bottom of the filter-chamber. Resting upon these beams J there are transverse ribs $j$, having their upper surfaces, as shown, in the form of two inclined planes, as shown, though I do not confine myself to this form, for they may be of conical, semicircular, in cross-section, or of any other suitable shape. I prefer, however, to have them in the shape of a section of a pyramid, as shown, to prevent the lodgment of the filtering material thereon. These transverse ribs $j$ are placed at convenient distances apart and between them I construct channels or troughs $l$. These channels $l$ are pierced with holes $n$ at a distance of, say, six inches apart, more or less, of such a size as will allow a requisite amount of wash-water sufficient for each unit of screen-surface to pass to the filter-bed, these units of surface being established by the stops $k$, Fig. 5. These stops are intended to divide the inflowing wash-water into a number of units in order that all parts of the filter-bed may be properly washed. It is well known that water will flow in the line of least resistance, and as it might happen that some portions of the water-channels might be blocked by silt or even by filtering material I have placed these stops at suitable intervals from the inlets for the wash-water to insure a pressure of the water upon such impeded passages, so as to clear away the obstructions. The aggregate of these holes $n$ should be of less capacity than that of the main inlet-pipe for the wash-water. In the preferred form of my invention rods $i$, having the spiral projections $w$ thereon, Fig. 4, are placed in these channels $l$ and secured therein by the stays $s$. These spiral projections $w$ serve a twofold purpose—namely, they serve to prevent the rods $i$ from accurately fitting the channels $l$, and thus permit orifices for the flow of water between the rods $i$ and the sides of the channel $l$, and they also serve, when the rod $i$ is partially rotated, as hereinafter described, to dislodge any silt or other clogging material which might tend to obstruct the free passage of the water between the rods $i$ and the sides of the channel $l$. The spiral rods $i$ are provided with one or more rods $r$, terminating in an eye at the top, by means of which they are keyed to the rods $r'$. One of the eyed rods (shown in Fig. 3 as $r^2$) is pivoted to the jointed lever $y$ $x$, as shown. The operation of the lever $y$ $x$ thus tends to a partial rotation of the rods $i$ and the removal of silt, as previously described. I do not, however, confine myself to this special means of rotating the rods $i$, for various other equivalent devices will readily suggest themselves to the mechanic for this purpose. The flooring thus described is strongly fastened down to the filter-bottom proper.

In Figs. 6, 7, and 8 I have shown a modification of my device. In this form of construction the rods $i$ are not shown as having spiral projections thereon, as it is not necessary to have the rods rotated and thereby remove the silt in all cases as where the washing is done with filtered water or whether substantially free from silt or vegetable matter. In this construction the rods $i$ rest upon brackets $p$, (Figs. 6 and 8,) secured at suitable intervals upon the top of the channel $l$. These brackets, which might be in the form of pins or projections of any other suitable shape, (or projections might even be placed upon the rod $i$ instead of the channel $l$,) serve to prevent the rods $i$ from fitting accurately into the channels $l$, so as to leave a passage or waterway between the rods $i$ and the sides of the channel $l$. Of course this waterway should only be of such width as to permit of the passage of water without permitting the escape of any of the filtering material. In other respects the construction is the same as in the preferred form of my invention. It will be seen that by this construction the wash-water is forcibly distributed to all of the lower portions of the filtering material, so that none of it escapes washing.

Having thus described my invention, what I desire to secure by Letters Patent is—

1. In a filter, a strainer consisting of a series of ribs connected longitudinally by perforated troughs or channels containing rods secured therein, and having a water-passage between said rods and the sides of the channels, substantially as described.

2. In a filter, a strainer consisting of a series of ribs connected longitudinally by perforated troughs or channels containing spirally-threaded rods secured therein, substantially as described.

3. In a filter, a strainer consisting of a series of ribs connected longitudinally by perforated troughs or channels containing spirally-threaded rods secured therein and means for partially rotating said rods, substantially as described.

JOHN W. HYATT.

Witnesses:
J. E. HINDON HYDE,
JAMES C. REILLY.